US010094541B1

(12) United States Patent
Alexander

(10) Patent No.: US 10,094,541 B1
(45) Date of Patent: Oct. 9, 2018

(54) FINGERNAIL LIGHT EMITTING DEVICE

(71) Applicant: Mark Alexander, Kissimmee, FL (US)

(72) Inventor: Mark Alexander, Kissimmee, FL (US)

( * ) Notice: Subject to any disclaimer, the term of this patent is extended or adjusted under 35 U.S.C. 154(b) by 347 days.

(21) Appl. No.: 14/986,658

(22) Filed: Jan. 2, 2016

(51) Int. Cl.

| | |
|---|---|
| ***G06F 3/042*** | (2006.01) |
| ***F21V 21/00*** | (2006.01) |
| ***F21K 2/06*** | (2006.01) |
| ***F21V 33/00*** | (2006.01) |
| ***F21V 23/02*** | (2006.01) |
| ***A45D 31/00*** | (2006.01) |
| *F21Y 101/02* | (2006.01) |
| *F21Y 113/00* | (2016.01) |

(52) U.S. Cl.
CPC .............. *F21V 21/00* (2013.01); *A45D 31/00* (2013.01); *F21K 2/06* (2013.01); *F21V 23/02* (2013.01); *F21V 33/0004* (2013.01); *F21Y 2101/02* (2013.01); *F21Y 2113/002* (2013.01)

(58) Field of Classification Search
CPC ......... F21V 21/00; F21V 17/00; A45D 31/00; A45D 29/22; A45D 2031/005
See application file for complete search history.

(56) References Cited

U.S. PATENT DOCUMENTS 4,787,742 A * 11/1988 Schiller ................ A61B 5/1172 356/71
2001/0037811 A1* 11/2001 Beuthan ............... A61B 5/0073 128/897
2003/0058636 A1* 3/2003 Smith ....................... F41G 1/36 362/111
2006/0060802 A1* 3/2006 Richter .............. G06K 9/00046 250/556
2009/0092291 A1* 4/2009 Nagasaka .......... G07C 9/00158 382/115
2012/0176343 A1* 7/2012 Holmgren ............... G06F 3/042 345/175
2016/0153643 A1* 6/2016 Schneider ................. F21S 8/04 362/311.02

* cited by examiner

*Primary Examiner* — Elmito Breval
(74) *Attorney, Agent, or Firm* — Gulf Coast Intellectual Property Group

(57) ABSTRACT

A novelty light configured to be releasably secured to a user's fingernail and further being configured to have disposed therein a first light source and a second light source. The novelty light includes a support member that is planar in manner having a radius that is approximately equivalent to a human fingernail. Secured to one end of the support member is a lighting chamber. The lighting chamber includes an interior volume having a first internal portion and a second internal portion containing a chemiluminescent material therein. A membrane is disposed within the interior volume of the lighting chamber intermediate the first internal portion and the second internal portion and is configured to be ruptured so as to facilitate the mixing of the chemiluminescent materials so as to produce light. The lighting chamber is further configured with a third internal portion isolated from the second internal portion and first internal portion.

17 Claims, 2 Drawing Sheets

FINGERNAIL LIGHT EMITTING DEVICE

FIELD OF THE INVENTION

The present invention relates generally to lighting apparatus, more specifically but not by way of limitation, a novelty light configured to be releasably secured to a user's finger wherein the novelty light is operable to produce light utilizing at least one method of light production.

BACKGROUND

Over the last few years, a phenomenon known as gloving has dramatically increased in popularity. Gloving is a new method to produce light shows at dance parties commonly know as raves. Attendees of these dance and music shows will utilize a plurality of lights that are integrally formed with gloves to produce a light show. The raves are executed in complete darkness and are coordinated with music. The aforementioned can occur wherein all of the attendees will utilize gloves configured with lights or certain performers will provide the light show utilizing the lighted gloves.

One issue with gloving is the use of the gloves as a means to provide support and a method for securing the lights to a user's hands. A conventional glove utilizing in the art of gloving is manufactured similarly to a typical glove having a body and fingers that are configured to surroundably mount a user's hands. The gloves will have a light source, typically an LED light affixed and/or integrated into the fingertip of each finger member. The gloves are typically made from cotton or other similar material. One issue with conventional gloving is the glove can become uncomfortable in warm environments. As these gloves are constructed similarly to conventional gloves, the use of the gloves in an environment that is warm causes excessive perspiration on the hands of the user. Additionally, the excessive perspiration can have a negative effect on the material of the glove as well. Many times users of the gloves will discard simply after one use due to the aforementioned issues.

Accordingly, there is a need for a novelty light that is configured to be releasably secured to the fingers of a user that does not require a conventional glove body.

SUMMARY OF THE INVENTION

It is the object of the present invention to provide a novelty light that is configured to be releasably secured to fingers of a user wherein the novelty light is operable to assist in the production of a light show having a support member, the support member being planar in manner having a first side and a second side.

Another object of the present invention is to provide a novelty light configured to be releasably secured to the fingers of a user's hand wherein the support member is further formed in an arcuate manner and is sized so as to be superposed a user's fingernail and be releasably secured thereto.

A further object of the present invention is to provide a novelty light that is utilized in environments such as but not limited to rave parties, wherein the novelty light further includes a light chamber, the light chamber being integrally secured to the support member.

Still another object of the present invention is to provide a novelty light that is configured to be releasably secured to a finger of a user wherein the light chamber further includes a first internal portion and a second internal portion wherein the first internal portion and second internal portion are separated by a membrane.

An additional object of the present invention is to provide a novelty light having a support member releasably superposed to a user's fingernail wherein the first internal portion and second internal portion have stored therein liquid materials operable to produce chemiluminescence subsequent mixing thereof.

Yet a further object of the present invention is to provide a novelty light configured to emit light therefrom wherein the light chamber includes an alternative embodiment having a third internal portion isolated from the first internal portion and second internal portion and further having an alternate light source disposed therein.

Another object of the present invention is to provide a novelty light configured to be releasably secured to a user's fingernails wherein the light chamber is manufactured in numerous different shapes.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

and

Figure 4:
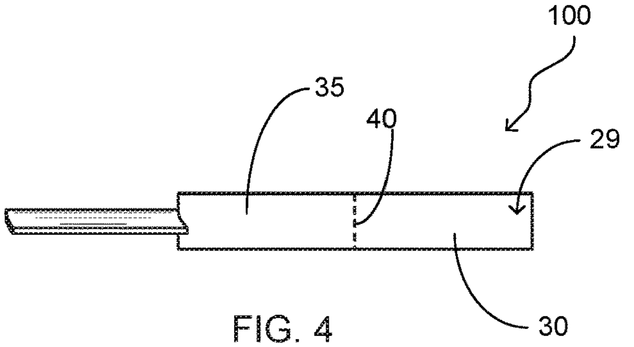
Figure 5:
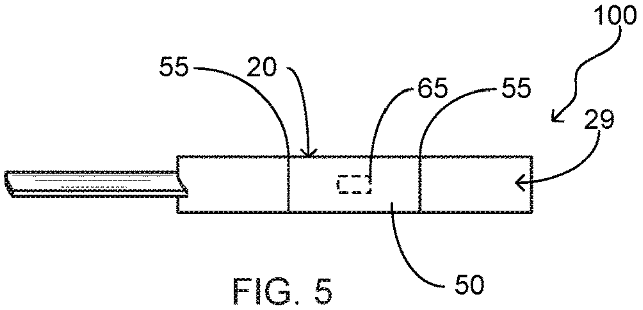

FIG. 4 is a cross-sectional side view of an embodiment of the present invention; and FIG. 5 is a cross-sectional side view of an alternative embodiment of the present invention.

DETAILED DESCRIPTION

Referring now to the drawings submitted herewith, wherein various elements depicted therein are not necessarily drawn to scale and wherein through the views and figures like elements are referenced with identical reference numerals, there is illustrated a novelty light 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 1:
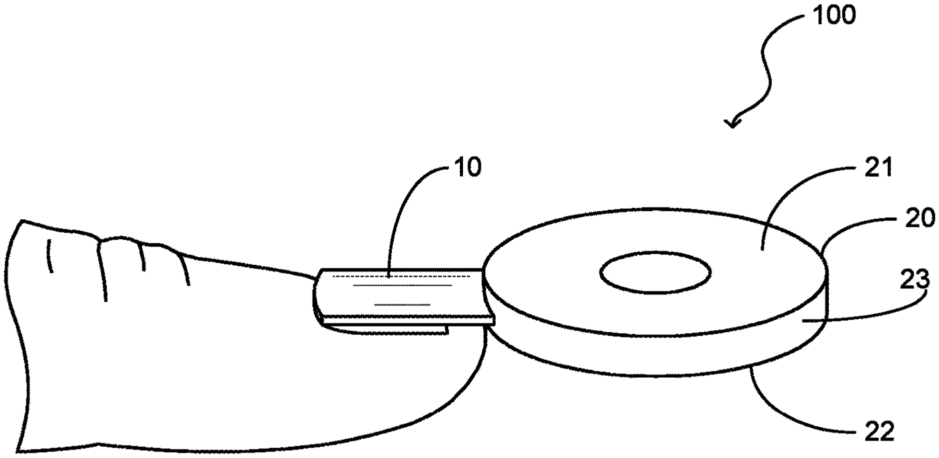
FIG. 1 is a perspective view of an alternative embodiment of the present invention.
Figure 2:
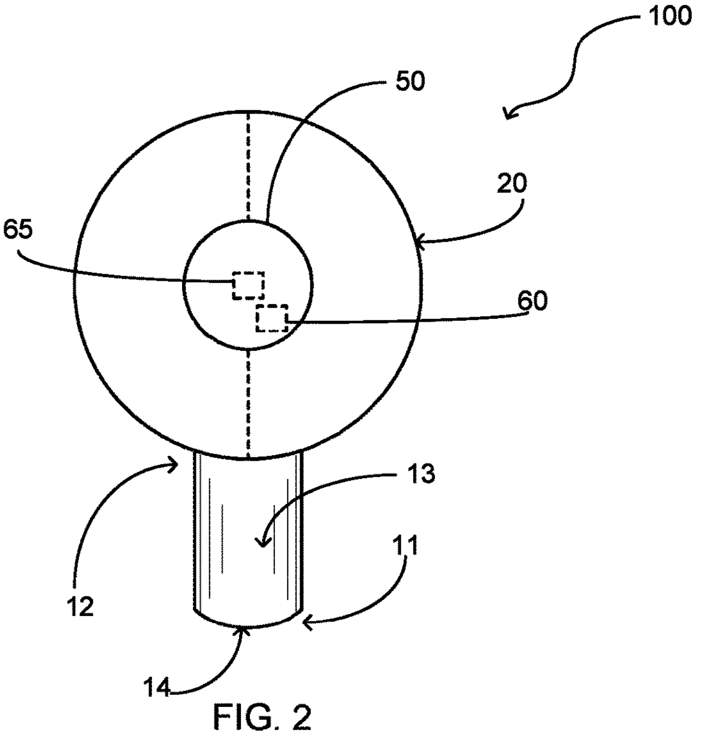
FIG. 2 is a top view of an alternative embodiment of the present invention.

Referring in particular to FIGS. 1 and 2 submitted herewith, the novelty light 100 includes support member 10. The support member 10 is planar and curved in manner and is manufactured from a suitable durable material such as but not limited to plastic. The support member 10 includes first end 11 and second end 12 and further includes an upper surface 13 and lower surface 14. The support member 10 is curved in manner having a radius that is generally equivalent to the radius of a human fingernail. The support member 10 includes an adhesive (not particularly illustrated herein) disposed on the lower surface 14 thereof. The adhesive is a conventional pressure sensitive adhesive or similar adhesive and is operable to secure the support member 10 to a fingernail of a human finger. More specifically, the support member 10 is superposed a human fingernail and is releasably secured thereto utilizing an adhesive layer that is disposed on the lower surface 14. It is contemplated within the scope of the present invention that the lower surface 14 could utilize numerous different types of adhesives in order to secure the support member 10 to a human fingernail. It is further contemplated within the scope of the present invention that the support member 10 could be manufactured in alternate sizes so as to accommodate human fingernails of different sizes. Furthermore, it should be recognized to those skilled in the art that the support member 10 could be manufactured in various lengths.

Figure 3:
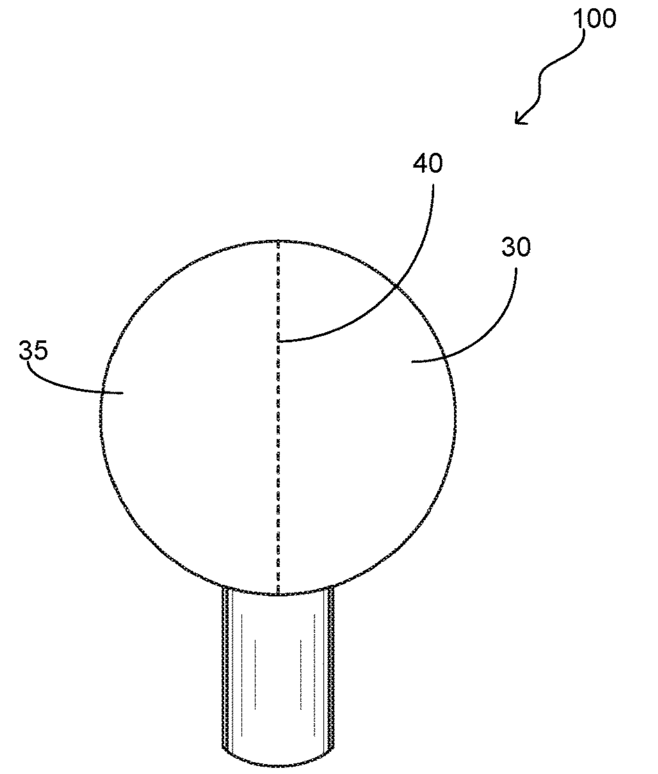
FIG. 3 is a bottom view of an embodiment of the present invention.

Secured to the second end 12 of the support member 10 is the lighting chamber 20. The lighting chamber 20 includes a top surface 21, bottom surface 22 and wall 23 integrally formed to create an interior volume 29. The lighting chamber 20 is manufactured from a suitable durable translucent material such as but not limited to plastic. The lighting chamber 20 is configured to produce light therefrom in order to create a desired effect. While the lighting chamber 20 is illustrated herein as being annular in shape, it is contemplated within the scope of the present invention that the lighting chamber 20 could be manufactured in various different shapes and sizes. In one embodiment, illustrated in particular herein in FIG. 3 and FIG. 4 the lighting chamber 20 includes a first internal portion 30 and a second internal portion 35. The first internal portion 30 and second internal portion 35 are disposed within the interior volume 29 of the lighting chamber 20 and are separated by a membrane 40. The first internal portion 30 and second internal portion 35 are hollow so as to store therein a liquid material configured to produce a light source via chemiluminesence ensuing the rupture of membrane 40. The membrane 40 is ruptured by a user applying pressure to the top surface 21 and bottom surface 22 of the lighting chamber 20. During the application of pressure to the upper surface 21 and lower surface 22, the membrane 40 which is manufactured from a thin material such as but not limited to plastic will rupture thus resulting in the mixing of the liquid materials disposed within the first internal portion 30 and second internal portion 35. It is contemplated within the scope of the present invention that numerous chemical liquids could be stored within the first internal chamber 30 and second internal chamber 35 so as to produce a desired light of various colors subsequent the rupture of the membrane 40. More specifically but not by way of limitation, the first internal portion 30 and second internal portion 35 could have disposed therein a luminol and a hydrogen peroxide. Additionally, fluorescent dyes could be present to provide various colors. It is further contemplated within the scope of the present invention that the first internal portion 30 and second internal portion 35 could be isolated utilizing an element other than membrane 40 in order to achieve the desired result as described herein.

FIGS. 1, 2 and 5 have illustrated herein an alternative embodiment of the lighting chamber 20. In the alternative embodiment illustrated in the aforementioned Figures, the lighting chamber 20 further includes a third internal portion 50. The third internal portion 50 is isolated utilizing second membrane 55 which is manufactured from a suitable durable material such as but not limited to plastic. The second membrane 55 differs from membrane 40 in that the second membrane 55 is designed not to be ruptured so as to maintain isolation of the third internal portion 50 from the first internal portion 30 and second internal portion 35. The third internal portion 50 includes power supply 60 and light source 65 disposed therein. The power source 60 is a conventional direct current power source having a conventional pressure switch operably coupled thereto that is operable to be activated with pressure applied to the upper surface 21 immediately thereabove so as to illuminate the light source 65. It is contemplated within the scope of the present invention that the light sources 65 could be manufactured from a LED light source. Those skilled in the art should recognize that the light source 65 could be manufactured from various different types of light producing elements. While in the illustrations herein the third internal portion 50 includes a light source 65, it is further contemplated within the scope of the present invention that the third internal portion 50 could be absent of a light producing element and manufactured from a non-translucent material so as to create a void (or dark area) within the lighting chamber 20 that emits no light in order to produce an alternate effect. It should be further recognized by those skilled in the art that the light source 65 disposed within the third internal portion 50 could emit a light in various colors and patterns. It should be additionally recognized that while the third internal portion 50 is illustrated herein as being annular in shape, it is contemplated within the scope of the present invention that the third internal portion 50 could be formed in various different shapes and sizes.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A fingernail light emitting device configured to be releasably secured to a user's finger comprising:

a planar support member, said planar support member being manufactured from a rigid material, and wherein said planar support member having a first end and a second end;

a lighting chamber, wherein said lighting chamber being secured to said second end of said support member, said lighting chamber having a top, a bottom and a wall integrally formed to create an interior volume, said lighting chamber having at least one light source disposed within said interior volume; and wherein the fingernail light emitting device is releasably secured to a user's fingernail so as to position the lighting chamber outward in front of the user's finger.

2. The fingernail light emitting device as recited in claim 1, wherein said interior volume of said lighting chamber further includes a first internal portion, said first internal portion containing a chemiluminescent material therein.

3. The fingernail light emitting device as recited in claim 2, wherein said interior volume of said lighting chamber further includes a second internal portion, said second internal portion containing a chemiluminescent material therein.

4. The fingernail light emitting device as recited in claim 3, and further including a membrane, said membrane disposed within said interior volume of said lighting chamber, said membrane intermediate said first internal portion and said second internal portion.

5. The fingernail light emitting device as recited in claim 4, wherein said support member further includes an upper surface and a lower surface, said lower surface having an adhesive disposed thereon so as to facilitate the releasable securing of the support member to a fingernail of a user.

6. The fingernail light emitting device as recited in claim 5, wherein said support member is formed having a radius generally equivalent to that of a human fingernail.

7. A fingernail light emitting device configured to be releasably secured to a human fingernail operable to produce light utilizing a first light source and a second light source comprising:

a support member, said support member being manufactured from a rigid material, said support member being planar in manner, said support member having a first end and a second end, said support member having an upper surface and a lower surface, said support member having a radius approximately equivalent to a radius of a human fingernail;

a lighting chamber, said lighting chamber being secured to said second end of said support member, said lighting chamber being manufactured from a translucent material, said lighting chamber having a top, a bottom and a wall integrally formed to create an interior volume, said lighting chamber having a first light source and a second light source disposed therein, said lighting chamber having a first internal portion, said first internal portion containing a chemiluminescent material therein; and wherein the fingernail light emitting device is releasably secured to a user's fingernail so as to position the lighting chamber outward in front of the user's finger.

8. The fingernail light emitting device as recited in claim 7, wherein said interior volume of said lighting chamber further includes a second internal portion, said second internal portion containing a chemiluminescent material therein.

9. The fingernail light emitting device as recited in claim 8, and further including a membrane, said membrane disposed within said interior volume of said lighting chamber, said membrane intermediate said first internal portion and said second internal portion, said membrane configured to be ruptured so as to facilitate mixing of the chemiluminescent materials disposed within said first internal portion and said second internal portion so as to create said first light source.

10. The fingernail light emitting device as recited in claim 9, and further including a third internal portion, said third internal portion disposed within said interior volume, said third internal portion being centrally located within said lighting chamber, said third internal portion being isolated from said first internal portion and said second internal portion, said third internal portion having said second light source disposed therein.

11. The fingernail light emitting device as recited in claim 10, and further including a power supply, said power supply disposed within said third internal portion, said power supply operably coupled to said second light source.

12. The fingernail light emitting device as recited in claim 11, wherein said second light source disposed within said third internal portion is a LED light.

13. The fingernail light emitting device as recited in claim 12, wherein said first light source and said second light source emit a light having different colors.

14. A fingernail light emitting device configured to be releasably secured to a fingernail of a human hand operable to emit light therefrom comprising:

a support member, said support member being manufactured from a rigid material, said support member being planar in manner, said support member having a first end and a second end, said support member having an upper surface and a lower surface, said support member having a radius approximately equivalent to a radius of a human fingernail;

a lighting chamber, said lighting chamber being secured to said second end of said support member, said lighting chamber being manufactured from a translucent material, said lighting chamber having a top, a bottom and a wall integrally formed to create an interior volume, said lighting chamber having a light source disposed therein, said lighting chamber having a first internal portion, said first internal portion containing a chemiluminescent material therein, said interior volume of said lighting chamber further including a second internal portion, said second internal portion containing a chemiluminescent material therein; and wherein the fingernail light emitting device is releasably secured to a user's fingernail so as to position the lighting chamber outward in front of the user's finger.

15. The fingernail light emitting device as recited in claim 14, and further including a membrane, said membrane disposed within said interior volume of said lighting chamber, said membrane intermediate said first internal portion and said second internal portion, said membrane configured to be ruptured so as to facilitate mixing of the chemiluminescent materials disposed within said first internal portion and said second internal portion facilitating emission of light from said lighting chamber.

16. The fingernail light emitting device as recited in claim 15, and further including a third internal portion, said third internal portion disposed within said interior volume, said third internal portion being centrally located within said lighting chamber, said third internal portion being isolated from said first internal portion and said second internal portion, said third internal portion being manufactured from a non-translucent material so as to inhibit the passage of light waves therethrough.

17. The fingernail light emitting device as recited in claim 16, wherein said lower surface of said support member has an adhesive thereon so as to facilitate releasable superposing the support member to a human fingernail.

* * * * *